United States Patent
Marvasti et al.

(10) Patent No.: US 9,298,538 B2
(45) Date of Patent: Mar. 29, 2016

(54) METHODS AND SYSTEMS FOR ABNORMALITY ANALYSIS OF STREAMED LOG DATA

(71) Applicant: VMware, Inc., Palo Alto, CA (US)

(72) Inventors: Mazda A. Marvasti, Irvine, CA (US); Arnak Poghosyan, Yerevan (AM); Ashot Harutyunyan, Yerevan (AM); Naira Grigoryan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 217 days.

(21) Appl. No.: 13/960,611

(22) Filed: Aug. 6, 2013

(65) Prior Publication Data
US 2014/0053025 A1  Feb. 20, 2014

Related U.S. Application Data

(60) Provisional application No. 61/684,018, filed on Aug. 16, 2012.

(51) Int. Cl.
   *G06F 11/07* (2006.01)
(52) U.S. Cl.
   CPC .......... *G06F 11/079* (2013.01); *G06F 11/0706* (2013.01); *G06F 11/0754* (2013.01); *G06F 2201/86* (2013.01)
(58) Field of Classification Search
   CPC ............ G06F 2201/86; G06F 2201/88; G06F 11/079; G06F 11/0766; H04L 63/1416; H04L 63/1425; H04L 43/04; H04L 43/064; H04L 43/0823; H04L 43/0829; H04L 43/0835; H04L 43/0841
   See application file for complete search history.

(56) References Cited

U.S. PATENT DOCUMENTS

| | | | | |
|---|---|---|---|---|
| 7,089,250 | B2 * | 8/2006 | Doganata | G06F 11/0709 |
| 8,332,690 | B1 * | 12/2012 | Banerjee | G06F 11/0793 714/26 |
| 2003/0028631 | A1 * | 2/2003 | Rhodes | 709/224 |
| 2003/0204370 | A1 * | 10/2003 | Yemini et al. | 702/183 |
| 2005/0283680 | A1 * | 12/2005 | Kobayashi et al. | 714/39 |
| 2008/0195369 | A1 * | 8/2008 | Duyanovich | G06F 11/0709 703/22 |
| 2008/0270071 | A1 * | 10/2008 | Marvasti et al. | 702/179 |
| 2010/0036643 | A1 | 2/2010 | Marvasti et al. | |
| 2010/0082638 | A1 | 4/2010 | Marvasti et al. | |
| 2010/0100775 | A1 * | 4/2010 | Slutsman et al. | 714/47 |
| 2010/0131952 | A1 * | 5/2010 | Akiyama et al. | 718/100 |
| 2012/0166869 | A1 * | 6/2012 | Young et al. | 714/15 |
| 2013/0097125 | A1 | 4/2013 | Marvasti et al. | |
| 2014/0025998 | A1 * | 1/2014 | Schimmelpfeng | G06F 11/079 714/39 |

OTHER PUBLICATIONS

Dean, Jeffrey et al., "MapReduce: Simplified Data Processing on Large Clusters", OSDI '04: 6th symposium on Operating systems Design and Implementation, Dec. 6-8, 2004, pp. 137-149.

* cited by examiner

*Primary Examiner* — Joseph Schell

(57) ABSTRACT

This disclosure presents systems and methods for run-time analysis of streams of log data for abnormalities using a statistical structure of meta-data associated with the log data. The systems and methods convert a log data stream into meta-data and perform statistical analysis in order to reveal a dominant statistical pattern within the meta-data. The meta-data is represented as a graph with nodes that represent each of the different event types, which are detected in the stream along with event sources associated with the events. The systems and methods use real-time analysis to compare a portion of a current log data stream collected in an operational window with historically collected meta-data represented by a graph in order to determine the degree of abnormality of the current log data stream collected in the operational window.

20 Claims, 17 Drawing Sheets

| Date | Time | Event Type | Event Source |
|---|---|---|---|
| — | — | $T_1$ | $S_8$ |
| | | ⋮ | ⋮ |
| — | — | $T_2$ | $S_1$ |
| | | ⋮ | ⋮ |
| — | — | $T_3$ | $S_K$ |
| | | ⋮ | ⋮ |
| — | — | $T_M$ | $S_5$ |
| | | ⋮ | ⋮ |

FIG. 3

| Stream entries | Time | Event Type ID ($T_i$) | Event Source ID ($S_k$) |
|---|---|---|---|
| 1. | 2:09:42 AM | 0 | 2 |
| 2. | 2:12:43 AM | 1 | 2 |
| 3. | 2:22:43 AM | 2 | 2 |
| 4. | 2:36:40 AM | 3 | 2 |
| 5. | 2:38:39 AM | 4 | 1 |
| 6. | 2:43:40 AM | 3 | 1 |
| 7. | 2:55:19 AM | 5 | 1 |
| 8. | 4:09:42 AM | 0 | 2 |
| 9. | 4:10:42 AM | 4 | 1 |
| 10. | 4:22:43 AM | 2 | 1 |
| 11. | 4:30:39 AM | 4 | 1 |
| 12. | 4:36:40 AM | 3 | 1 |
| 13. | 4:38:39 AM | 4 | 1 |
| 14. | 4:43:40 AM | 3 | 1 |
| 15. | 4:55:19 AM | 5 | 1 |
| 16. | 5:09:42 AM | 0 | 2 |
| 17. | 5:22:43 AM | 2 | 2 |
| 18. | 5:30:39 AM | 4 | 2 |
| 19. | 5:36:40 AM | 3 | 2 |
| 20. | 5:38:39 AM | 4 | 1 |
| 21. | 5:43:40 AM | 3 | 1 |
| 22. | 5:55:19 AM | 5 | 1 |
| 23. | 6:09:42 AM | 0 | 2 |
| 24. | 6:22:43 AM | 2 | 2 |
| 25. | 6:34:39 AM | 4 | 2 |
| 26. | 6:35:40 AM | 3 | 2 |
| 27. | 8:02:43 AM | 2 | 2 |
| 28. | 8:10:30 AM | 4 | 2 |
| 29. | 8:11:40 AM | 3 | 2 |
| 30. | 9:22:43 AM | 2 | 2 |
| 31. | 9:30:39 AM | 4 | 2 |
| 32. | 9:46:42 AM | 0 | 2 |
| 33. | 10:00:43 AM | 2 | 2 |
| 34. | 10:15:43 AM | 2 | 2 |
| 35. | 10:17:39 AM | 4 | 2 |
| 36. | 10:19:40 AM | 3 | 2 |
| 37. | 11:50:39 AM | 4 | 2 |
| 38. | 11:51:43 AM | 2 | 1 |
| 39. | 12:02:40 AM | 3 | 1 |
| 40. | 12:03:43 AM | 0 | 2 |

FIG. 10

| Event type $T_i$ | $N(T_i)$ |
|---|---|
| 0 | 5 |
| 1 | 1 |
| 2 | 8 |
| 3 | 9 |
| 4 | 10 |
| 5 | 3 |
FIG. 11A
| Event type pair $<i,j>$ | $N(T_i, T_j | S_k, \Delta t)$ | $N(T_i)$ | $P(i|j)$ |
|---|---|---|---|
| <0,2> | 4.0 | 5.0 | 4/5 |
| <2,3> | 6.0 | 8.0 | 6/8 |
| <2,4> | 6.0 | 8.0 | 6/8 |
| <4,3> | 8.0 | 10.0 | 8/10 |
| <4,2> | 1.0 | 10.0 | 1/10 |
| <3,5> | 3.0 | 9.0 | 3/9 |
| <3,4> | 1.0 | 9.0 | 1/9 |
FIG. 11B
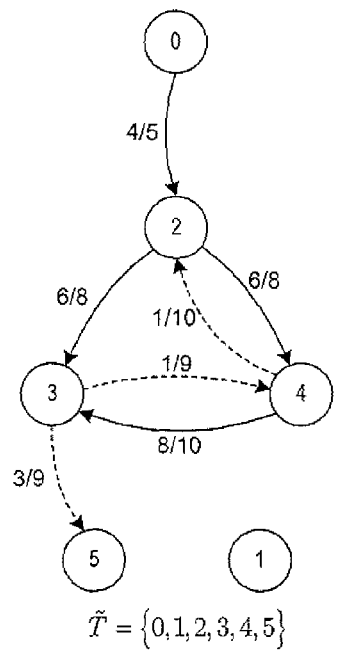
$\tilde{T} = \{0,1,2,3,4,5\}$
$\tilde{P} = \begin{Bmatrix} P(0|2), P(2|3), P(2|4), P(4|3), \\ P(4|2), P(3|5), P(3|4) \end{Bmatrix}$
FIG. 11C
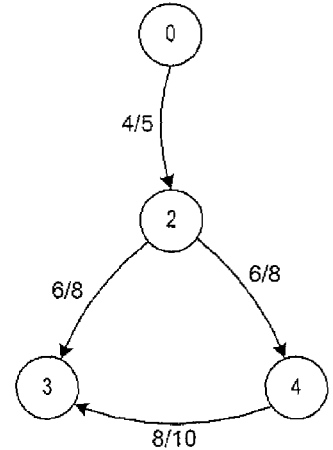
$\tilde{T}_{DNG} = \{0,2,3,4\}$
$\tilde{P}_{DNG} = \{P(0|2), P(2|3), P(2|4), P(4|3)\}$
FIG. 11D

| Event type $T_i$ | $N(T_i)$ |
|---|---|
| 0 | 2 |
| 2 | 5 |
| 3 | 5 |
| 4 | 5 |
FIG. 12A
| Event type pair $<i,j>$ | $N(T_i, T_j \mid S_k, \Delta t)$ | $N(T_i)$ | $P(i \mid j)$ |
|---|---|---|---|
| <2,3> | 3.0 | 5.0 | 3/5 |
| <2,4> | 4.0 | 5.0 | 4/5 |
| <4,3> | 4.0 | 5.0 | 4/5 |
| <0,2> | 2.0 | 2.0 | 2/2 |
FIG. 12B
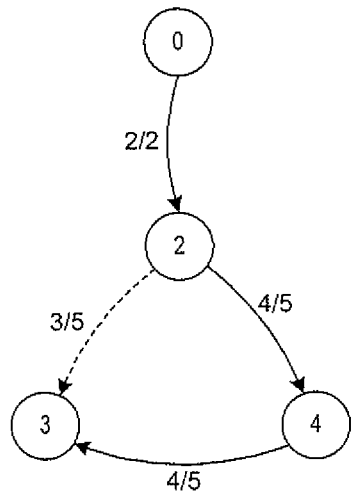
$\tilde{T}' = \{0, 2, 3, 4\}$
$\tilde{P}' = \{P(2 \mid 3), P(2 \mid 4), P(4 \mid 3), P(0 \mid 2)\}$
FIG. 12C
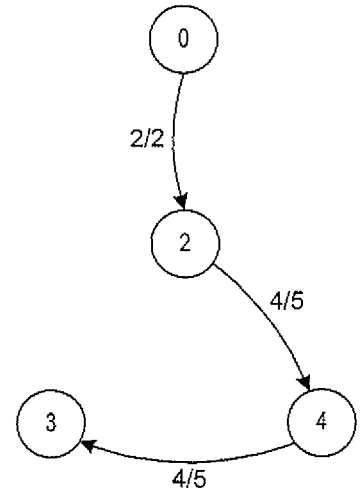
$\tilde{T}'_{DNG} = \{0, 2, 3, 4\}$
$\tilde{P}'_{DNG} = \{P(2 \mid 4), P(4 \mid 3), P(0 \mid 2)\}$
FIG. 12D

| ID | Event Type | Attribute |
|---|---|---|
| 0 | vim.event.AlarmStatusChangedEvent | info |
| 1 | vim.event.TaskEvent | info |
| 2 | vim.event.VmBeingHotMigratedEvent | info |
| 3 | vim.event.VmEmigratingEvent | info |
| 4 | vim.event.VmResourceReallocatedEvent | info |
| 5 | vim.event.VmMessageEvent | info |
| 6 | vim.event.DrsVmMigratedEvent | info |
| 9 | vim.event.AlarmActionTriggeredEvent | info |
| 10 | vim.event.AlarmSnmpCompleteEvent | info |
| 11 | vim.event.VmReconfiguredEvent | info |
| 14 | vim.event.VmAcquiredMksTicketEvent | info |
| 16 | vim.event.VmStoppingEvent | info |
| 17 | vim.event.VmPoweredEvent | info |
| 18 | vim.event.VmStartingEvent | info |
| 20 | vim.event.DrsVmPoweredOnEvent | info |
| 21 | vim.event.VmPoweredOnEvent | info |
| 22 | vim.event.VmDisconnectedEvent | info |
| 23 | vim.event.VmConnectedEvent | info |
| 26 | vim.event.VmResettingEvent | info |
| 29 | vim.event.VmRegisteredEvent | info |
| 32 | vim.event.VmBeingRelocatedEvent | info |
| 33 | vim.event.VmRelocatedEvent | info |
| 35 | vim.event.VmRenamedEvent | warning |
| 41 | vim.event.VmDiscoveredEvent | info |
| 49 | vim.event.VmInstanceUuidConflictEvent | error |
| 50 | vim.event.VmMacConflictEvent | error |
| 51 | vim.event.VmInstanceUuidChangedEvent | info |
| 52 | vim.event.VmMacChangedEvent | warning |

FIG. 14

| Time | VM Name | Generated Event ID | Missing Event ID | Mismatch Score |
|---|---|---|---|---|
| A | communities-1t-db-1 | 0, 1, 10 | - | 40.9% |
| | | 9 | 0 | |
| | | 2, 3 | 4 | |
| B | ora-dev2-ksdmmk-dl | 23 | 0 | 100% |

FIG. 17

METHODS AND SYSTEMS FOR ABNORMALITY ANALYSIS OF STREAMED LOG DATA

CROSS-REFERENCE TO RELATED APPLICATION

This application claims the benefit of Provisional Application No. 61/684,018, filed Aug. 16, 2012.

TECHNICAL FIELD

The present disclosure relates to computational systems and methods for analyzing abnormalities in streams of log data.

BACKGROUND

In recent years, the volume, complexity, diversity and velocity of data generated by computational systems, such as information technology ("IT") infrastructures and cloud computing, have forced many organizations to reconsider their approach to data management and data analytics. One approach to managing and analyzing the performance of computational systems is to analyze log files generated by the computational system. Each log file is a chronological record of events that take place in the operation of the system and can be used to analyze the activity and behavior of event sources in order to diagnose problems. An event is any detectable action generated by an event source, and an event source is any physical or virtual component of the system, such as a server, virtual machine ("VM"), a program, a network, a database, a process control system, and an operating system. An event may be something as simple as a command, warning, or announcement generated by an event source, such as a command to retrieve data from memory, a warning regarding the availability of memory, or announcement that a VM has moved.

Computational system analysts typically search log files to identify abnormalities and identify abnormally behaving event sources. The abnormalities can be software failures, programming bugs, hardware breakdowns, and even human errors. Because most IT and cloud-based applications use text based logging to record events, the log data is typically retrospectively analyzed for abnormalities which is impractical for identification of ran-time abnormalities. Researchers and developers of data-processing systems and information-extraction tools as well as a wide variety of different types of computer users, computer manufacturers, and computer vendors continue to seek systems and methods for detection of abnormalities generated by event sources.

SUMMARY

This disclosure presents systems and methods for run-time analysis of streams of log data for abnormalities using a statistical structure of meta-data associated with the log data. The systems and methods convert a log data stream into meta-data and perform statistical analysis in order to reveal a dominant statistical pattern within the meta-data. The meta-data is represented as a graph with nodes that represent each of the different event types, which are detected in the stream along with event sources associated with the events. The systems and methods use real-time analysis to compare a portion of a current log data stream collected in an operational window with historically collected meta-data represented by a graph in order to determine the degree of abnormality of the current log data stream collected in the operational window. The resulting meta-data graph also reveals a fundamental structure or behavioral footprint of the meta-data beyond the source and processes.

DESCRIPTION OF THE DRAWINGS

FIG. 3 shows an example stream of log data.
FIG. 10 shows a table of example six event types and two event sources.
FIGS. 11A-11D demonstrate determination of a dynamic normalcy graph for entries 1-36 of the table shown in FIG. 10.
FIGS. 12A-12D demonstrate determination of a dynamic normalcy graph for entries 18-36 of the table shown in FIG. 10.
FIG. 14 shows a table that identifies names of number nodes of the graph shown in FIG. 13.
FIG. 17 shows a table of abnormally behaving virtual machines.

DETAILED DESCRIPTION

Figure 1:
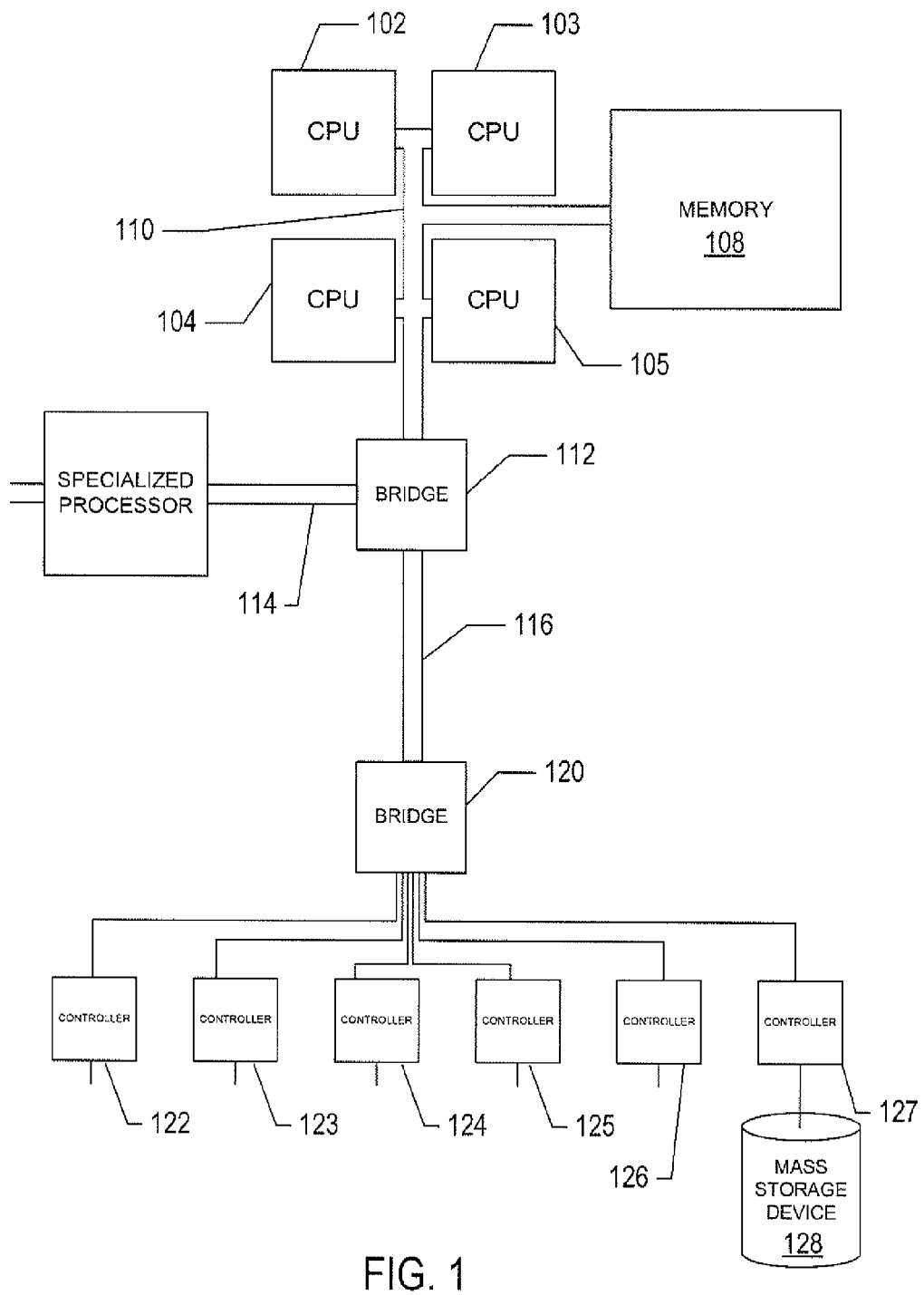
FIG. 1 shows an example of a generalized computer system.

Computational systems and methods for detecting abnormalities in streams of log data are disclosed. The current systems and methods are based on retrieval of a statistical structure from streams of log data. The analysis provided by the current systems and methods addresses a rapidly growing desire to make run-time decisions based on abnormalities generated in computing environments and recorded in streams of log data. The current systems and methods described below include the concept of dynamic thresholding of time series data to any kind of log data composed of a stream of records and events. Normalcy of the streams as an extracted statistical structure is disclosed, along with a mechanism for abnormality detection in run-time mode.

The current systems and methods receive a stream of log data and convert the log data stream into meta-data represented as a virtual data graph that reveals the dominant or normal statistical patterns within the log data. The graph represents different event types as nodes which are detected in the stream along with associated event sources. Two nodes in the graph are connected by an edge if the corresponding event types occur within the same time window and share a common event source. The behavior of the sources in terms of generating different event types creates probabilistic correlations between nodes computed with application of a proximity measure. The graph represents the normal or dominant common behavioral structure of the log data stream independent of the event sources. Using the graph as a basis to determine normal source behavior, the currently disclosed method then identifies abnormalities is the upcoming portions of the log data streams in terms of their deviation from the graph. This is performed by matching the event types collected in an observation window of currently received log data entries with the historical meta-data represented in the graph and conditionally checking whether the most probable event types are realized in the observation window. The currently disclosed method can quantify deviation of the current portion of log data collected in the observation window from the typical historical log data patterns. This quantity actually measures the degree of abnormality in the current log data stream.

Because streams of log data are continuously generated, the log files may be classified as "big data." A problem in processing "big data" is the limited availability of data for retrospective analysis. Big data, by its very nature, puts limits on storage and input/output and severely restricts other methods that require the complete log data set to be available. By contrast, the methods described below convert the stream of log data into meta-data represented by a graph. The useful content and the historical statistical structure of the log data stream is retained in the graph so that portions of the current log data stream can be compared with the graph in order to identify abnormalities without having to resort to a retrospective analysis of the entire log data set.

It should be noted at the onset that a log data stream of event types and corresponding event sources and the associated meta-data are not, in any sense, abstract or intangible. Instead, the log data and associated meta-data are necessarily digitally encoded and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems on electronically or magnetically stored data, with the results of the data processing and data analysis digitally encoded and stored in one or more tangible, physical, data-storage devices and media.

FIG. 1 shows an example of a generalized computer system that executes efficient methods for nm-time identification of abnormalities in streams of log data and therefore represents a data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. The busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of computer-readable media, such as computer-readable medium 128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 128 is a data-storage device, including electronic memory, optical or magnetic disk drive, USB drive, flash memory and other such data-storage device. The computer-readable medium 128 can be used to store machine-readable instructions that encode the computational methods described below and can be used to store encoded data, during store operations, and from which encoded data can be retrieved, during read operations, by computer systems, data-storage systems, and peripheral device.

The systems and methods for analyzing a stream of log data for abnormalities can be executed during run-time of a computational system that generates the stream of log data. As a result, the system and method can provide an observer of the computational system with near real-time results of detected abnormalities. The term "near real-time" refers to a time delay due to data transmission and data processing that is short enough to allow detection and reporting of abnormalities during operation of the computational system. For example, the term "near real-time" can refer to detection and reporting of abnormal events and abnormal event sources while the current method is executed at the current time minus any time delay due to data transmission and data processing. The term "near real-time" also refers to situations where the detection and reporting of abnormalities appears instantaneous to an observer of the computational system.

Figure 2:
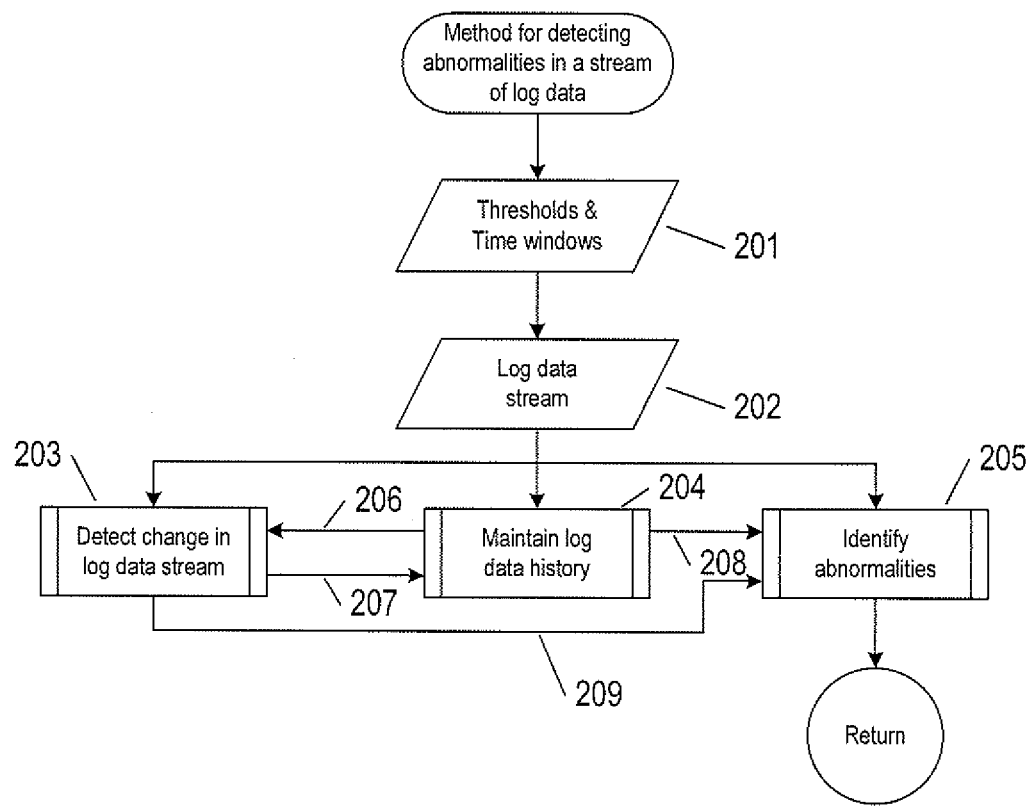
FIG. 2 shows a flow diagram of a method for identifying abnormalities in a stream of log data.

FIG. 2 shows a flow diagram of a method for identifying abnormal event sources based on a stream of log data generated by the event sources. In block 201, numerical values for thresholds and time windows may be input by a user. For example, the user may input a similarity threshold, $Th_{similarity}$, and a mismatch threshold, $Th_{mismatch}$, and may input time windows $\Delta t$ and $\Delta w$. The thresholds and time window are described in greater detail below. The similarity threshold is used to determine a degree of similarity between a portion of current log data from historical log data, and the mismatch threshold is used to separate abnormally behaving event sources from normally behaving event sources. In block 202, a stream of log data is received. In the following description, the stream of log data is interpreted as a flow of text consisting of events with associated event types and event sources that can be detected via a log parsing procedure as described in "Pattern detection in unstructured data: An experience for a virtualized IT infrastructure," by M. A. Marvasti et al, IFIP/IEEE International Symposium on Integrated Network Management 2013, or described in "Automated analysis of unstructured data," US patent 2013/0097125, filed Mar. 12, 2012, and owned by VM Ware, Inc. A procedure for the automatic detection of event attributes is one example of an event detection mechanism, which is the basic assumption behind the current method for processing a stream of log data in terms of extracting fundamental statistical characteristics.

FIG. 3 shows an example stream of log data with columns listing date, time, event type, and event source. The log data stream contains I different event types denoted by $T_i$ and K different event sources $S_k$. In the example of FIG. 3, event source $S_8$ generates an event type $T_1$, event source $S_1$ generates an event type $T_2$ and so on.

Figure 4:
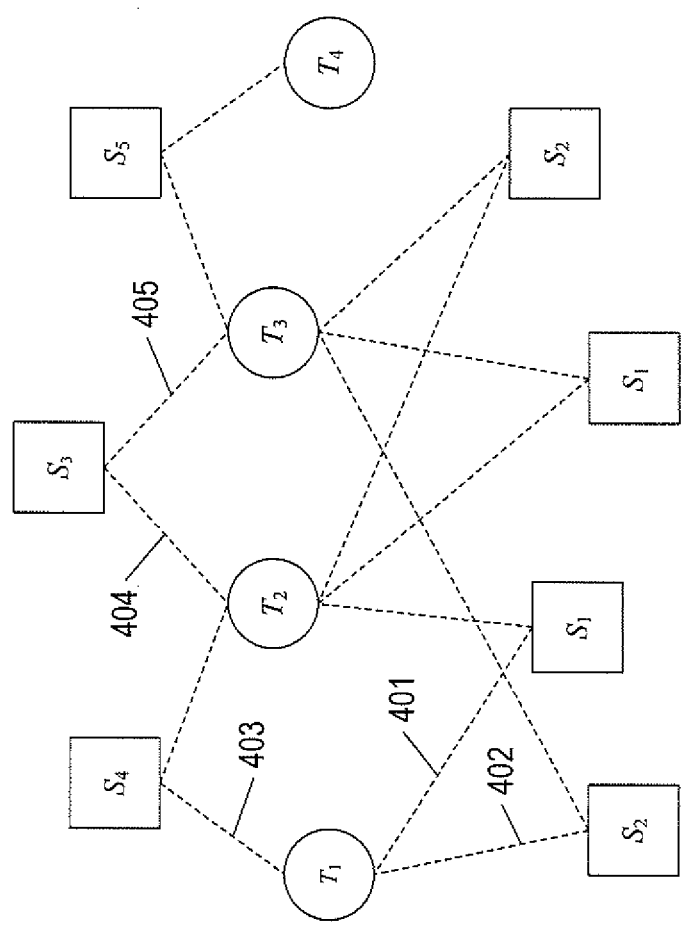
FIG. 4 shows an example of five event sources represented by squares and four event types represented by circles.

An event type may be generated by more than one source and a source may generate more than one event type. FIG. 4 shows an example representation of five event sources $S_1$, $S_2$, $S_3$, $S_4$ and $S_5$ represented by squares and four event types $T_1$, $T_2$, $T_3$ and $T_4$ represented by circles. Dashed lines indicate which event types are generated by an event source. For example, dashed lines 401-403 indicate that event type $T_1$ may be generated by event sources $S_1$, $S_2$, and $S_4$, respectively, and dashed lines 404 and 405 indicate that the two event types $T_2$ and $T_3$ may be generated by a single event source $S_3$.

Figure 5A:
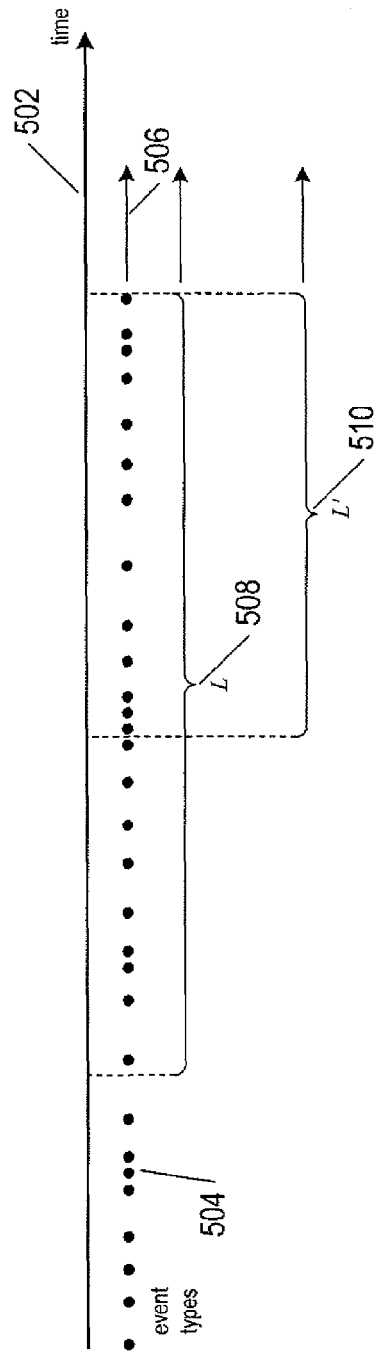
FIGS. 5A-5B show examples of first and second sets of events collected from a stream of log data.
Figure 5B:
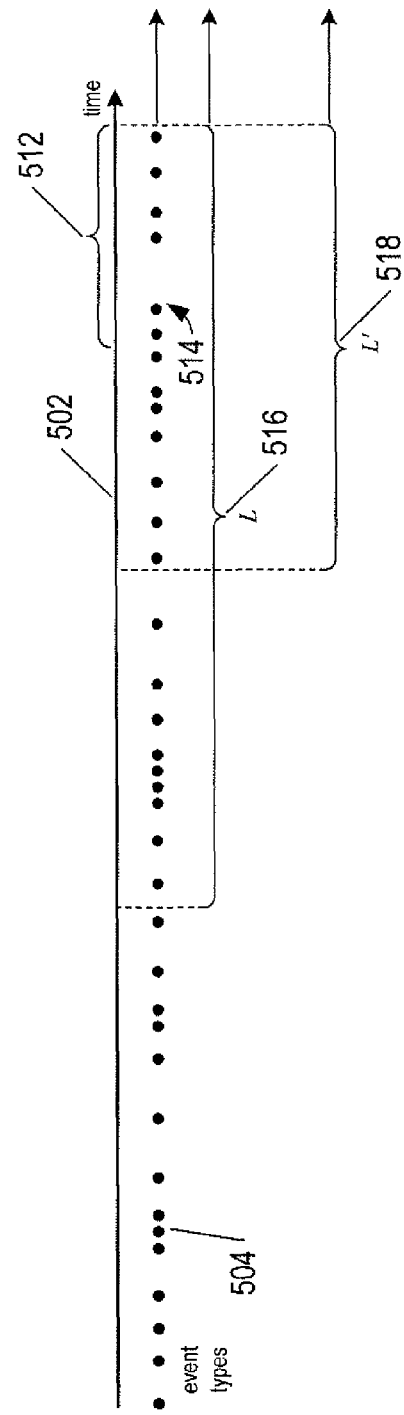

Returning to FIG. 2, the stream of log data 202 is input to three separate routines identified as "detect change in log data stream" 203, "maintain log data history" 204, and "identify abnormalities" 205. The routines 203-205 operate in parallel on a different portions of the stream of log data. FIG. 5A shows examples of relative number of event types used in routines 203 and 204. In FIG. 5A, a directional arrow 502 represents increasing time and each dot 504 in a series of dots represents an event type that occurs at some point in time and is recorded in a stream of log data. The events are not regularly spaced in time as indicated by variations in the time spacing between dots. Directional arrow 506 represents events that are generated as time increases. The routine "maintain log data history" 204 receives a first set composed of L 508 of the most recent event types, and the routine "detect change in log data stream" 203 receives a second set of L' 510 of the most recent event types, where L' is less than L. After the L and L' events have been processed separately by the routines 204 and 203, respectively, a wait time is allowed to pass to allow more events to be generated. In certain embodiments, the waiting time is not constant in order to allow a fixed number X of events to be generated each time the routines 203 and 204 are called. As a result, the number of events L and L' input each time the routines 204 and 203, respectively, are called are constant. In other words, the wait time corresponds to an amount of time in which X events are allowed to be generated so that the first set of L events input to the routine 204 is updated to include the X most recent events and exclude the earliest X events, and the second set of L' events input to the routine 203 is updated to include the X most recent events and exclude the earliest X events. As shown in FIG. 5B, a wait time 512 enables six additional event types 514 to be generated. The first set of L event types 516 input to the routine 204 is updated to include the six most recent events and exclude the earliest six events, and the second set of L' event types 518 input to the routine 203 is updated to include the six most recent events but to exclude the earliest six events. Alternatively, the wait time can be constant in which case L and L' may vary each time the routines 204 and 203 are called.

Returning to FIG. 2, the routines 203-205 share data as indicated by directional arrows 206-209. In particular, directional arrows 206 and 207 represent data that is exchanged between the routine "detect change in log stream" 203 and the routine "maintain log data history" 204 and directional arrow 208 represents data output from the routine "maintain log data history" 204 and input to the routine "identify abnormalities" 205.

Figure 6:
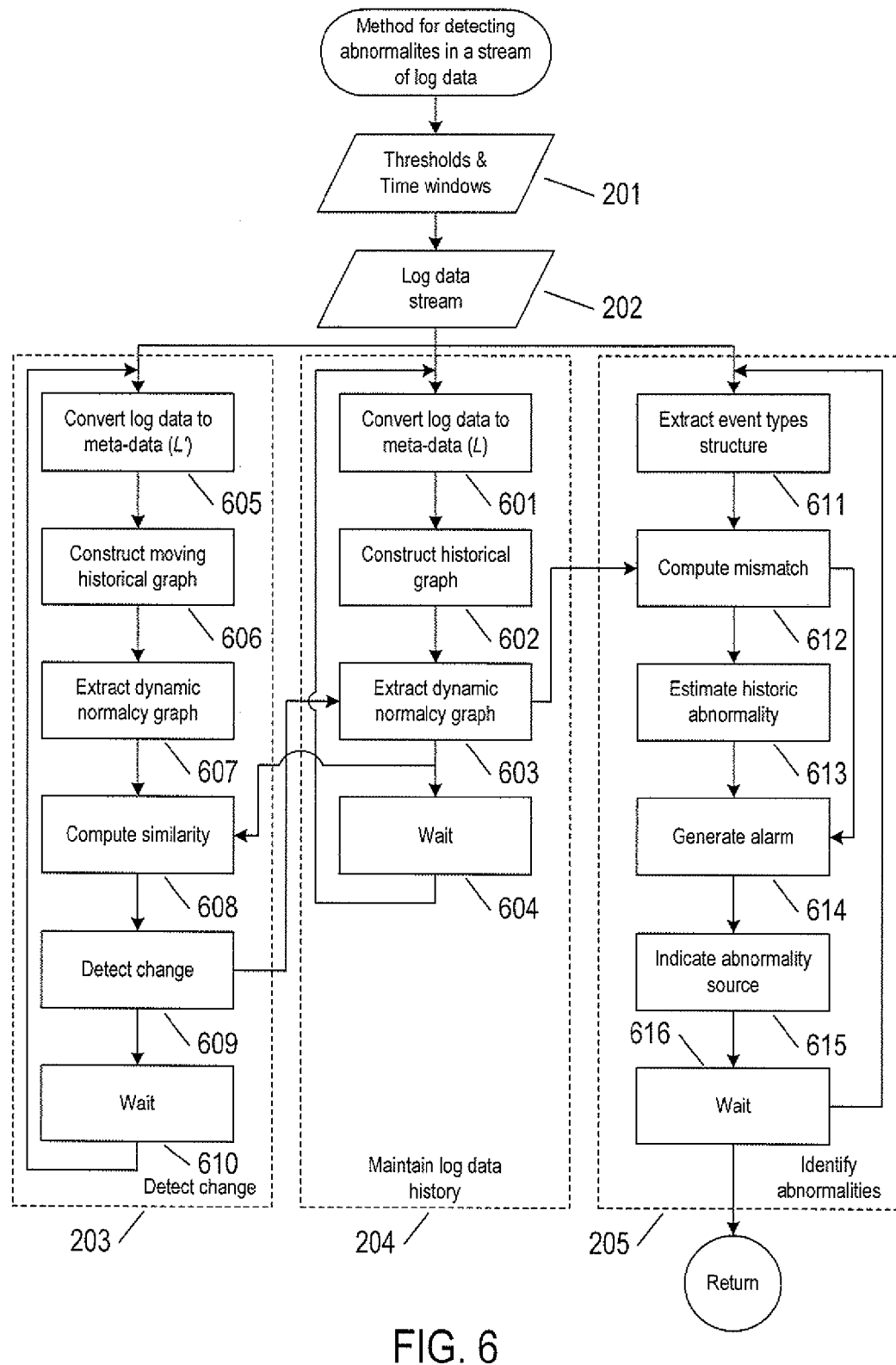
FIG. 6 shows three separate flow diagrams associated with each of the routines of the flow diagram in FIG. 2.

FIG. 6 shows three separate expanded flow diagrams associated with the routines "detect change in the log data stream" 203, "maintain log data history" 204, and "identify abnormal sources" 205. The stream of log data 202 is input to blocks 601, 604, and 608 and the routines 203, 204, and 205 may be executed in parallel. The following description begins with the routine "maintain log data stream" 204. In block 601, L events of the stream of log data is converted into meta-data using a time windows $\Delta t$. The meta-data represents a relationship between two different event types $T_i$ and $T_j$, where the events $T_i$ and $T_j$ originate from the same event source $S_k$ and within the time window $\Delta t$. For example, returning to the example of FIG. 4, the two event types $T_2$ and $T_3$ may be considered related to each other because they originate from the same event source $S_3$ provided the event types occur within the time window $\Delta t$. The meta-data in block 601 is calculated for the L event types received as a conditional probability of the event type $T_i$ occurring when another event type $T_j$ is observed, both associated with the same event source $S_k$ and in the same time window $\Delta t$, as follows:

$$P(T_i \mid T_j, \Delta t) = \frac{\sum_{k=1}^{K} N(T_i, T_j \mid S_k, \Delta t)}{N(T_j)} \quad (3)$$

where $N(T_i, T_j \mid S_k, \Delta t)$ represents the number of joint occurrence of the event type pair $(T_i, T_j)$ originating from the source $S_k$ in the time window $\Delta t$; and $N(T_j)$ represents the number of occurrences of the event type $T_j$ in the L events input to the routine 204.

The conditional probabilities between two event types $P(T_i \mid T_j, \Delta t)$ can be represented by concise notations $P(i \mid j)$ and $P_{i \mid j}$.

Figure 7:
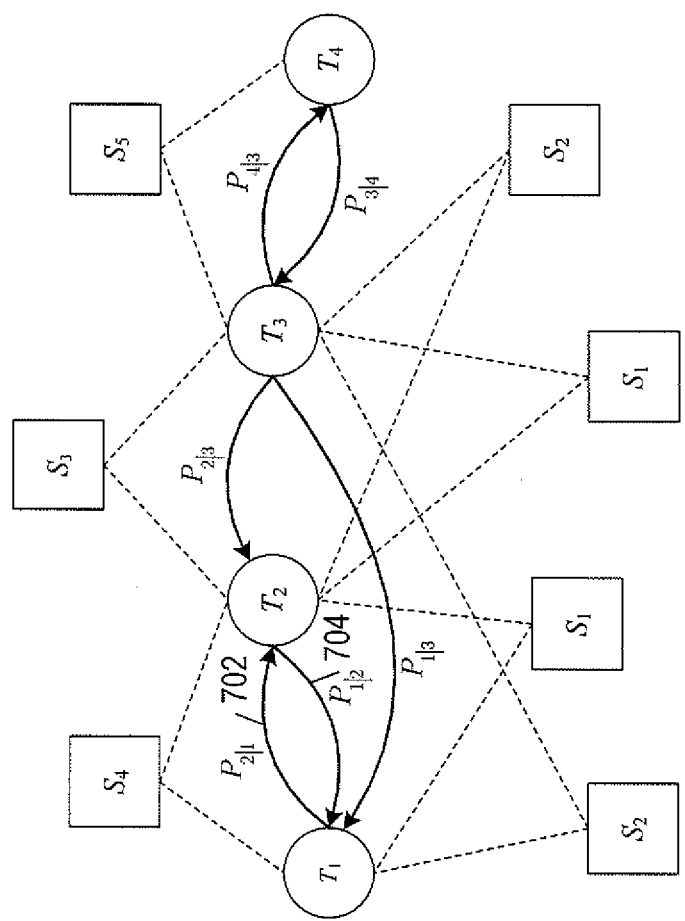
FIG. 7 shows an example of meta-data represented by directional arrows for the event types and event sources shown in FIG. 4.

FIG. 7 shows an example of meta-data represented by directional arrows for the event types and event sources shown in FIG. 4. For example, directional arrow 702 represents a conditional probability $P(T_2 \mid T_1, \Delta t) = P_{2 \mid 1}$ of event type $T_2$ occurring when event type $T_1$ is observed. Directional arrow 704 represents a conditional probability $P(T_1 \mid T_2, \Delta t) = P_{1 \mid 2}$ of event type $T_1$ occurring when event type $T_2$ is observed. Both event types originate from event sources $S_1$ and $S_4$ in the same time interval $\Delta t$. Zero conditional probabilities are not represented.

Returning to FIG. 6, the meta-data computed in block 601 also includes calculation of prior probabilities for each event type in the L events input to the routine 204. The prior probabilities are calculated according to the following frequency:

$$P(T_i) = \frac{1}{L} N(T_i) \quad (4)$$

where $i = 1, \ldots, I$.

Note that the above mentioned frequencies can be updated cumulatively and the corresponding meta-data in the form of the virtual graph can be updated with the expansion of the stream.

The event types collected in the time window $\Delta t$ form a set $$\tilde{T} = \{T_1, \ldots, T_I\}$$

and the associated non-zero conditional probabilities calculated according to Equation (3) form a set $$\tilde{P} = \{P_{i \mid j}\}_{i \neq j}$$

where $i, j = 1, \ldots, I$; and the symbol "~" represents a set.

Each pair of elements in $\tilde{T}$, $(T_i, T_j)$, is mathematically related to one of the elements $P_{i \mid j}$ of $\tilde{P}$. This mathematical relationship may be represented by a graph that consists of the two sets $\tilde{T}$ and $\tilde{P}$ and is denoted by $(\tilde{T},\tilde{P})$. The elements of $\tilde{T}$ are called vertices or nodes, and the elements of $\tilde{P}$ are called edges that connect two vertices (i.e., pair of metrics). In block 602, a graph $(\tilde{T},\tilde{P})$ called a "historical graph" is constructed for the mathematically related sets of event types and stored in a computer-readable medium. The historical graph $(\tilde{T},\tilde{P})$ produced in block 602 hides the event sources.

Figure 8:
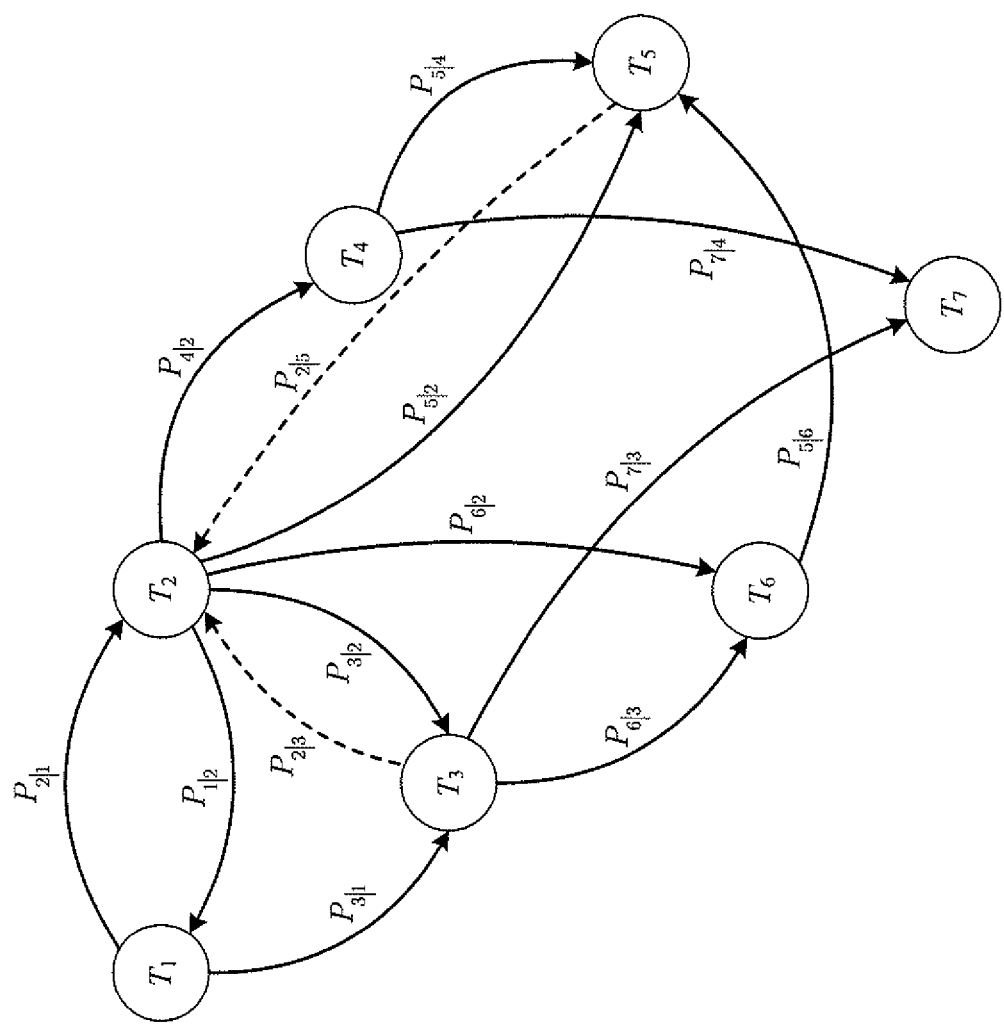
FIG. 8 shows an example of a historical graph of meta data.

FIG. 8 shows an example of a historical graph composed of seven event types represented by circles and associated non-zero conditional probabilities represented by directional arrows. Note that event sources are not represented in the historical graph shown in FIG. 8. The only information retained in the historical graph data sets are the event types and the associated non-zero conditional probabilities calculated according to Equation (3).

The normalcy structure of the stream is defined by its meta-data and in terms of the dominating statistical relations in the historical graph $(\tilde{T},\tilde{P})$. Returning to FIG. 6, in block 603, small conditional probabilities are considered outliers and are discarded from the set of conditional probabilities P to produce a dynamic normalcy graph ("DNG"), $(\tilde{T},\tilde{P})_{DNG}$. The small conditional probabilities may be discarded based on a user defined dynamic normalcy threshold, $Th_{DNG}$, as follows:

---
for each $P_{i|j} \in \tilde{P}$
  if $(P_{i|j} < Th_{DNG})$ {
    $\tilde{P} = \tilde{P} - P_{i|j}$;
  }
---

As a result, the operation in block 603 reduces the historical graph $(\tilde{T},\tilde{P})$ to a sub-graph $(\tilde{T},\tilde{P})_{DNG}$ composed of dominating conditional probabilities. The DNG is the log data stream's historical footprint of common probabilistic behavior of event types that result from all possible event sources.

Figure 9:
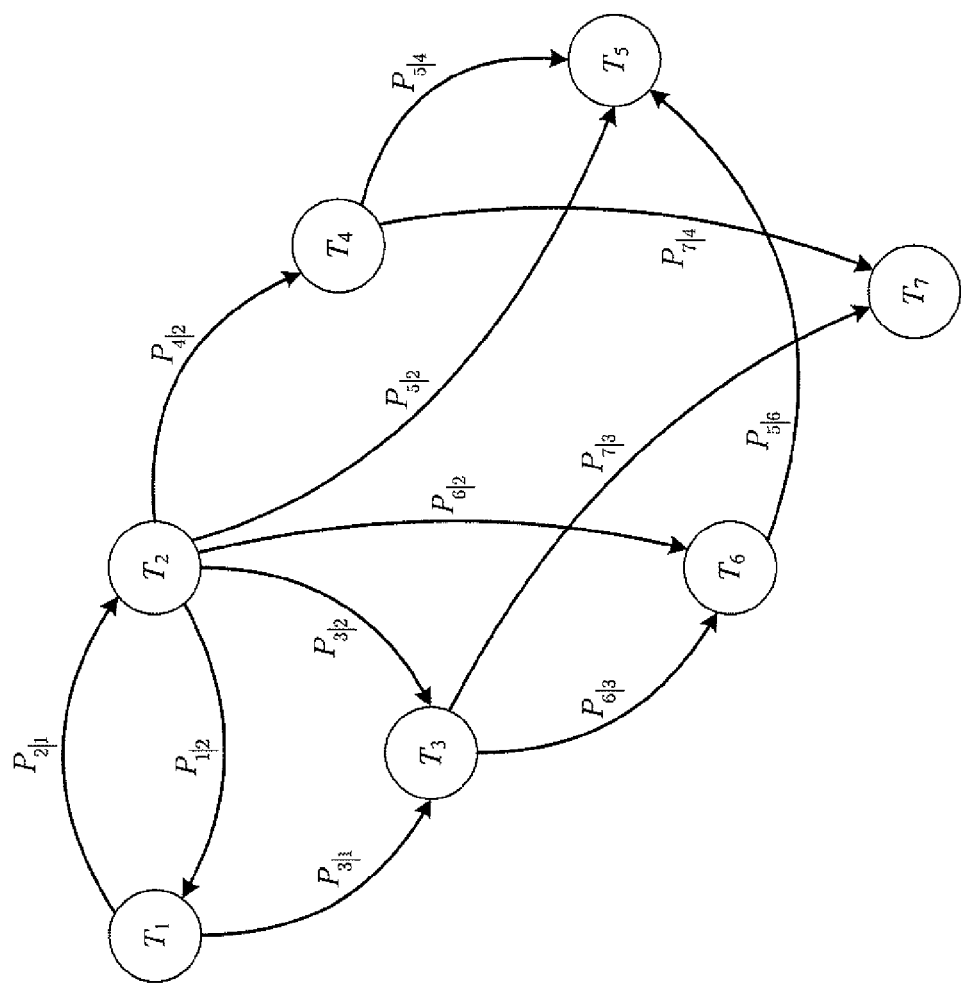
FIG. 9 shows an example of a dynamical normalcy graph obtained from the historical graph in FIG. 8.

FIG. 9 shows an example of a DNG. The DNG results from discarding edges 802 and 804 in FIG. 8. In this example, the conditional probabilities $P_{2|3}$ and $P_{2|5}$ associated with the edges 802 and 804 are less than a user defined threshold $Th_{DNG}$ and are discarded from the set of conditional probabilities to give the DNG shown in FIG. 9.

In block 604, a wait time is allowed to elapse in which more events are generated as described above with reference to FIG. 5.

Global changes in the stream which may skew the abnormality analysis and may be detected with a procedure that compares two meta-data portions representing the stream in terms of mismatch between the graph representations. In FIG. 2, the routine "detect change in log data stream" 203 determines whether the stream of log data has substantially changed during its development. This is accomplished with the meta-data structure represented in the DNG. In block 605, the stream of log data 202 is converted to meta-data using Equation (3) for the first L' entries in the stream of log data. In other words, Equation (3) described above is used to calculate conditional probabilities for the event types first L' entries in the stream of log data as described above with reference to FIG. 5. The number of event types L' is large enough to provide sufficient statistics. In other words, no other statistic that can be calculated from the same sample of L' event types provides any additional information with regard to detecting change in the log data stream. As soon as the sufficient number of statistics (i.e., number of event types) are available, in block 606, the L' event types are converted into meta-data according to Equation (3). A graph $(\tilde{T}',\tilde{P}')$ called a "moving historical graph" is constructed, where $\tilde{T}'$ is the set of L' event types and $\tilde{P}'$ is the associated set of conditional probabilities calculated according to Equation (3). In other words, the graph $(\tilde{T}',\tilde{P}')$ is generated in block 606 in parallel to the graph $(\tilde{T},\tilde{P})$ generated in block 602. For example, a historical moving graph $(\tilde{T}',\tilde{P}')$ may be obtained with L'=L/2 event types, provided L' produces sufficient statistics. In block 607, a DNG $(\tilde{T}',\tilde{P}')_{DNG}$ for the graph $(\tilde{T}',\tilde{P}')$ is calculated as described above with reference to block 603. In block 608, a similarity measure between the DNG $(\tilde{T},\tilde{P})$ constructed in block 603 and the moving $(\tilde{T}',\tilde{P}')_{DNG}$ constructed in block 607 is calculated as follows:

$$Sim(G, G') = \frac{\|\tilde{P} \cap \tilde{P}'\| + \|\tilde{T} \cap \tilde{T}'\|}{\|\tilde{P} \cap \tilde{P}'\| + \|\tilde{T} \cap \tilde{T}'\|} \times \left(1 - \frac{\sum_{i,j,i \neq j} |P_{i|j}(G) - P_{i|j}(G')|}{\|\tilde{P} \cap \tilde{P}'\|}\right) \quad (5)$$

where
$G = (\tilde{T},\tilde{P})_{DNG}$;
$G' = (\tilde{T}',\tilde{P}')_{DNG}$; and
$\|\cdot\|$ is the cardinality of the set.

The similarity Sim value lies in the range [0,1] where a Sim value of "0" corresponds to no similarity (i.e., no vertices or edges in common) and a Sim value of "1" corresponds to identical graphs (i.e., same vertices and edges). In the above expression, the left-hand fraction is the geometric similarity of the DNGs and the right-hand expression is the probabilistic closeness for the conditional probabilities on jointly present edges. Where the DNGs have no edges in common, $\|\tilde{P} \cap \tilde{P}'\|=0$, Sim is defined as "0."

In block 609, the Sim value is used to determine whether the stream of log data has substantially changed over time. The degree of similarity can be determined by the threshold $Th_{similarity}$ input in block 201. When Sim is greater than $Th_{similarity}$, the historical DNG $(\tilde{T},\tilde{P})_{DNG}$ and the moving historical DNG $(\tilde{T}'/\tilde{P}')_{DNG}$ are considered similar. In other words, the changes in the stream of log data are acceptable. However, when Sim is less than or equal to $Th_{similarity}$, the historical DNG $(\tilde{T},\tilde{P})$ and the moving historical DNG $(\tilde{T}',\tilde{P}')_{DNG}$ are considered dissimilar and the method declares a change point to replace the historic DNG $(\tilde{T},\tilde{P})_{DNG}$ with the meta-data of the moving historical DNG $(\tilde{T}',\tilde{P}')_{DNG}$. In block 610, the wait time is allowed to elapse in which more events are generated as described above with reference to FIG. 5.

FIGS. 10-12 provide a simple numerical demonstration of the operations performed in blocks 601-603 and blocks 605-607 for an example portion of a hypothetical stream of log data with six event types $T_0$, $T_1$, $T_2$, $T_3$, $T_4$, and $T_5$ and two event sources $S_1$ and $S_2$. Column 1001 represents times when events occur, column 1002 is a list of indices for the event types $T_0$, $T_1$, $T_2$, $T_3$, $T_4$, and $T_5$, and column 1002 is a list of indices for the two event sources $S_1$ and $S_2$. Column 1004 is a list of integers used to identify entries in the stream of events. In FIGS. 11A-11D, the events 1-36 (i.e., L=36) are processed according to blocks 601-603 for a time window of $\Delta t=15$ minutes. FIG. 11A shows a table of event types $T_i$ and a number of times $N(T_i)$ each event type occurs for the 36 events. FIG. 11B shows a table event types pairs $\langle i|j \rangle$, number of joint occurrences $N(T_i,T_j|S_k,\Delta t)$, number of times $N(T_i)$ for event type $T_i$, and conditional probabilities $P(i|j)$ for the event type pairs calculated according to Equation (3). The number of joint occurrences $N(T_i,T_j|S_k,\Delta t)$ are determined for $\Delta t=15$ minutes. For example, table entry $N(T_0,T_2|S_k,\Delta t)=4.0$ is produced by pairs of event types $T_0$ and $T_2$ that originate from the same event source $S_2$ and occur within the time window of 15 minutes are 1,3; 16,17; 23,24; and 32,33. Note that entries 8 and 9 are also $T_0$ and $T_2$ events that occur within the time window, but they originate from different event sources. FIG. 11C shows a historical graph $(\tilde{T},\tilde{P})$ for the five event types and conditional probabilities. FIG. 11D shows a DNG $(\tilde{T},\tilde{P})_{DNG}$ obtained from using $Th_{DNG}=0.7$. In FIGS. 12A-12D, the events 18-36 (i.e., L'=18) are processed according to blocks 605-607 for the time window of $\Delta t=15$ minutes. FIG. 12A shows a table of event types $T_i$ and a number of times $N(T_i)$ each event type occurs for the 18 events. Note that only the four event types $T_0$, $T_2$, $T_3$, and $T_4$ occur in the 18 events. FIG. 12B shows a table of event types pairs $\langle i|j \rangle$, number of joint occurrences $N(T_i,T_j|S_k,\Delta t)$, number of times $N(T_i)$ for event type $T_i$, and conditional probabilities $P(i|j)$ for the event type entries 18-36. FIG. 12C shows a historical graph $(\tilde{T},\tilde{P})$ for the four event types and conditional probabilities. FIG. 12D shows a DNG $(\tilde{T},\tilde{P})_{DNG}$ obtained from using $Th_{DNG}=0.7$. The similarity between the DNG shown in FIG. 11D and the DNG shown in FIG. 12D calculated according to Equation (5) is given by $$Sim = \frac{7}{8} \times \left(1 - \frac{(1-0.8)+(0.8-0.75)+(0.8-0.8)}{3}\right)$$
$$= 0.802$$

where
$\|\tilde{P}_{DNG} \cap \tilde{P}'_{DNG}\|=3$,
$\|\tilde{P}_{DNG} \cup \tilde{P}'_{DNG}\|=4$,
$\|\tilde{T}_{DNG} \cap \tilde{T}'_{DNG}\|=4$, and
$\|\tilde{T}_{DNG} \cup \tilde{T}'_{DNG}\|=4$.
When Sim is greater than $Th_{similarity}$ (e.g., $Th_{similarity}=0.50$), the historical DNG $(\tilde{T},\tilde{P})_{DNG}$ is assumed to have not changed.

In the routine "identify abnormalities" 205, the event types in the observation window $\Delta w$ of the stream of log data are mapped to the DNG to compare the mismatch between run-time scenarios to those in the log data history. The degree of mismatch represents the degree of abnormality of the near real-time data. In block 611, $j(\Delta w)$ most recent event types $T_1$, $T_2$, ..., $T_{j(\Delta w)}$ of the stream of log data are collected in the observation window $\Delta w$. A subset $T_{j_1}, T_{j_2}, \ldots, T_{j_k(\Delta w)}$ of the event types $T_1, T_2, \ldots, T_{j(\Delta w)}$ are pair-wise in proximity for event source $S_k$, and the following condition holds:

$$j(\Delta w) = \sum_{k=1}^{k(\Delta w)} j_k(\Delta w) \quad (6)$$

where $k=1, \ldots, k(\Delta w)$.
The event types collected in the observation window $\Delta w$ can be matched on the DNG with the edges having matched nodes highlighted.

In block 612, a probabilistic mismatch (i.e. the degree of abnormality) between this matched sub-graph and the DNG is computed according to $$M(\Delta w) = \sum_{k=1}^{k(\Delta w)} M(S_k, \Delta w) \quad (7)$$

where $M(S_k,\Delta w)$ is a source mismatch assigned to event source $S_k$ and is calculated according to $$M(S_k, \Delta w) = \frac{\sum_{j=1}^{j_k(\Delta w)} \sum_{i=1,i\neq j}^{m(j)} P(i|j)}{\sum_{j=1}^{j(\Delta w)} \sum_{i=1,i\neq j}^{\overline{m}(j)} P(i|j)} \times 100 \quad (8)$$

where it is assumed in the DNG that nodes adjacent to j nodes (i.e., event types) are enumerated from 1 to $m(j)$. Absent nodes (i.e., event types) in $\Delta w$ are enumerated from 1 to $\overline{m}(j)$. Note that the summations $$\sum_{i=1,i\neq j}^{m(j)} P(i|j)$$

and $$\sum_{i=1,i\neq j}^{\overline{m}(j)} P(i|j)$$

are performed over the conditional probabilities on the directed edges arising from the node j in the DNG. The value of the mismatch $M(\Delta w)$ lies in the interval [0,100] percent.

Measuring the mismatch between a run-time flow of events types and the historical normalcy graph allows for control of unacceptable deviations and to generate alarms. In block 613, historic abnormalities are calculated and estimates of their normal level are determined using whiskers method, which recognizes the concentration of data points from out-of-range values or applying a high quantile cut of data. Consider a set of h mismatches:

$$\overline{M} = \{M_1(\Delta w), M_2(\Delta w), \ldots, M_h(\Delta w)\} \quad (9)$$

each calculated according to Equation (7) for a different set of event types collected at h previous different times increments for the observation window $\Delta w$. Consider the Qth quantile of $\overline{M}$ denoted by $Q(\overline{M})$. An estimate of the historical abnormality is calculated according to the method of whiskers as follows:

$$D_0(\Delta w) = 0.75(\overline{M}) + 1.5 iqr(\overline{M}) \quad (10)$$

where
   $0.75(\overline{M})$ is the third quartile or $75^{th}$ percentile of the set $\overline{M}$; and
   $iqr(\overline{M})$ is the interquartile range (the difference between 0.75 and 0.25 quantiles) of $\overline{M}$.
   Alternatively, in block 613, $D_0(\Delta w)$ can be calculated as a 0.9 or higher quantile of $\overline{M}$ regulated by a sensitivity parameter $s \in [0,1]$, where $s=1$ corresponds to $0.9\overline{M}$ (i.e., $90^{th}$ percentile of the set $\overline{M}$) and $s=0$ is the maximum of M. The deduced historical abnormality $D_0(\Delta w)$ is an estimate of the run-time historical abnormality. As a result, only the abnormalities with their mismatch $M(\Delta w)$ above $D_0(\Delta w)$ are reported. In block 614, a relative abnormality degree $D(\Delta w)$ is calculated at run time as follows:

$$D(\Delta w) = M(\Delta w) - D_0(\Delta w) \quad (11)$$

When the relative abnormality degree $D(\Delta w)$ is greater than "0," the mismatch $M(\Delta w)$ for the current observation window $\Delta w$ is greater than the historical abnormality $D_0(\Delta w)$ and an alarm is generated. Otherwise, the relative abnormality degree D ($\Delta w$) is less than or equal to "0," in which case the mismatch $M(\Delta w)$ for the current observation window $\Delta w$ is less than the historical abnormality $D_0(\Delta w)$ and no alarm is generated.

Alternatively, in block 613, instead of calculating $D_0(\Delta w)$, a dynamic time-dependent historical abnormality $D_0(\Delta w)$ can be calculated for greater abnormality control as described in U.S. patent application "Data agnostic anomaly detection," application Ser. No. 13/853,321 owned by VM Ware, Inc.

During abnormality detection by the mismatch calculation in block 612, the event types that contribute to the mismatch can be identified and stored in a computer-readable medium. The event types can be checked in terms of the event sources associated to the event types. In block 615, an ordered list of recommendations indicating the most likely event sources of abnormalities are generated. In order to generate the recommendations and indicate the event sources most likely responsible for the abnormalities, let $S_1, S_2, \ldots, S_{k(\Delta w)}$ be the event sources for the event types $T_{j_1}, T_{j_2}, \ldots, T_{j(\Delta w)}$ in run-time mode. For each event source $S_k$, the corresponding source mismatches are collected in a list:

$$M(S_1,\Delta w), M(S_2,\Delta w), \ldots, M(S_{k(\Delta k)},\Delta w) \qquad (12)$$

The sources are then ordered according to their corresponding mismatch values and displayed for a final recommendation as indications of abnormal event sources. In order to shorten the series in Equation (9), values below the user specific mismatch threshold $Th_{mismatch}$ may be removed from the list. In block 614, the time window $\Delta w$ is incrementally moved to collect the latest event types as described above with reference to Equation (2).

The following is an example calculation of mismatches for a historical abnormality $D_0$. The historical abnormality $D_0$ is calculated as a quantile with sensitivity s=1, and therefore the quantile 0.9, of the following series of fourteen mismatch values: {32.61, 0, 0, 51.6, 0, 0, 0, 0, 0, 0, 0, 67.39, 65.21, 0} for the data displayed in the table of FIG. 10. The fourteen mismatch values correspond to probabilistic mismatches $M_1(\Delta w), M_2(\Delta w), \ldots, M_4(\Delta w)$, respectively. In particular, the first four probabilistic mismatches $M_1(\Delta w), M_2(\Delta w), M_3(\Delta w)$, and $M_4(\Delta w)$ are calculated as follows. With reference to FIG. 10, for a first observation window $\Delta w$=15 minutes, the event entries 1-3 are corresponding event types 0, 1, and 2 originate from event source 2 (i.e., $S_2$) are realized, and expected are event types 2, 3, and 4, respectively. However the event type 4 is missing for event source 2. Therefore, the source mismatch for the event source 2 is given by $$M_1(S_2, \Delta w) = \frac{\frac{6}{8}}{\frac{4}{5} + \frac{6}{8} + \frac{6}{8}} \times 100\%$$
$$= \frac{6}{8} \times \frac{40}{92} \times 100\%$$
$$= 32.61\%$$

And the probabilistic mismatch is given by $$M_1(\Delta w) = M_1(S_2,\Delta w) = 32.61\%$$

In the second 15 minute observation window fall the entries 4-6. Here the event types 3 (from source 2), 4 (from source 1), and 3 (from source 1) are realized and there are no expected event types. Therefore, the source and probabilistic mismatches are zero for all sources:

$$M_2(S_2,\Delta w)=0,$$

$$M_2(S_1,\Delta w)=0, \text{ and}$$

$$M_2(\Delta w)=0$$

In other words, when there is no expectation, the source mismatches are zero. There is only one entry 7 for the third observation window. The event type 5 is realized from source 1 and the DNG has no expectation value from this. Therefore, the source and probabilistic mismatches are given by:

$$M_3(S_1,\Delta w)=0, \text{ and}$$

$$M_3(\Delta w)=0$$

In the fourth 15 minute observation window, the event types 0 (from source 2), 4 (from source 1), and 2 (from source 1) are realized. According to the DNG, the missing event types are 2 (for source 2) and 3 (for source 1). Therefore, in order to calculate the corresponding source and probabilistic mismatches, the missing conditionals in the numerators and the overall expectations in the DNG are given by:

$$M_4(S_1, \Delta w) = \frac{\frac{8}{10}}{\frac{4}{5} + \frac{8}{10} + \frac{6}{8} + \frac{6}{8}} \times 100\%$$
$$= \frac{8}{10} \times \frac{40}{124} \times 100\%$$
$$= 25.8\%,$$

$$M_4(S_2, \Delta w) = \frac{\frac{4}{5}}{\frac{4}{5} + \frac{8}{10} + \frac{6}{8} + \frac{6}{8}} \times 100\%$$
$$= \frac{4}{5} \times \frac{40}{124} \times 100\%$$
$$= 25.8\%,$$

and $$M_4(\Delta w) = M_4(S_1, \Delta w) + M_4(S_2, \Delta w)$$
$$= 51.6\%$$

In the following description, the abnormality degree above $D_0$ is shown for new event entries 37-40 1006 in FIG. 10. New entries 37-40 fall into a 15 minute observation window $\Delta w$, and correspond to of event types 4 (from source 2), 2 (from source 1), 3 (from source 1), and 0 (from source 2). However event types 3 (for source 2), 4 (for source 1), and 2 (for source 2) are missing. As a result, the source and probabilistic mismatches are given by:

$$M_{active}(S_1, \Delta w) = \frac{\frac{8}{10} + \frac{4}{5}}{\frac{4}{5} + \frac{8}{10} + \frac{6}{8} + \frac{6}{8}} \times 100\%$$
$$= \frac{\frac{64}{40}}{\frac{124}{40}} \times 100\%$$
$$= \frac{64}{124} \times 100\%$$
$$= 51.6\%$$

$$M_{active}(S_2, \Delta w) = \frac{\frac{6}{8}}{\frac{4}{5}+\frac{8}{10}+\frac{6}{8}+\frac{6}{8}} \times 100\%$$

$$= \frac{6}{8} \times \frac{40}{124} \times 100\%$$

$$= 24.2\%,$$

and $$M_{active}(\Delta w) = M_{active}(S_1, \Delta w) + M_{active}(S_2, \Delta w) +$$
$$= 75.9\%$$

The following table summarizes the mismatch results for entries 37-40.

| Event Source | Gen.-ted Event ID | Missing Event ID | Score % |
|---|---|---|---|
| Source 1 | 2, 3 | 4 | 51.6 |
| Source 2 | 4, 0 | 3, 2 | 24.2 |

Results for Virtual Center Events

Results from applying the above described systems and methods applied to a stream of log data are now described. Using the information on event types and on fleeting virtual machines ("VMs") or hosts as sources of the event types, the statistical normalcy structure of the stream is determined. Comparison of near real-time data to this graph allows determination of abnormality patterns. Through that comparison, the degree of abnormality can be used by an alerting engine within an infrastructure management system. Note that the method was applied to normalcy analysis of a virtual center at different hierarchical levels (VM, host, cluster, etc.).

The application of the abnormality detection method to parsed log data of virtual center consisted of 200,000 events (a time period spanning one month) is discussed next. In this case, the event sources are VM's or hosts and the event types are the corresponding types from the log, such as VmEmigratingEvent or VmStoppingEvent with additional categories they are attributed to in the stream, for example, "info" or "error." So for the analysis the combinations such as "VmEmigratingEvent+info" and "VmEmigratingEvent+error" are interpreted as basic event types.

Figure 13:
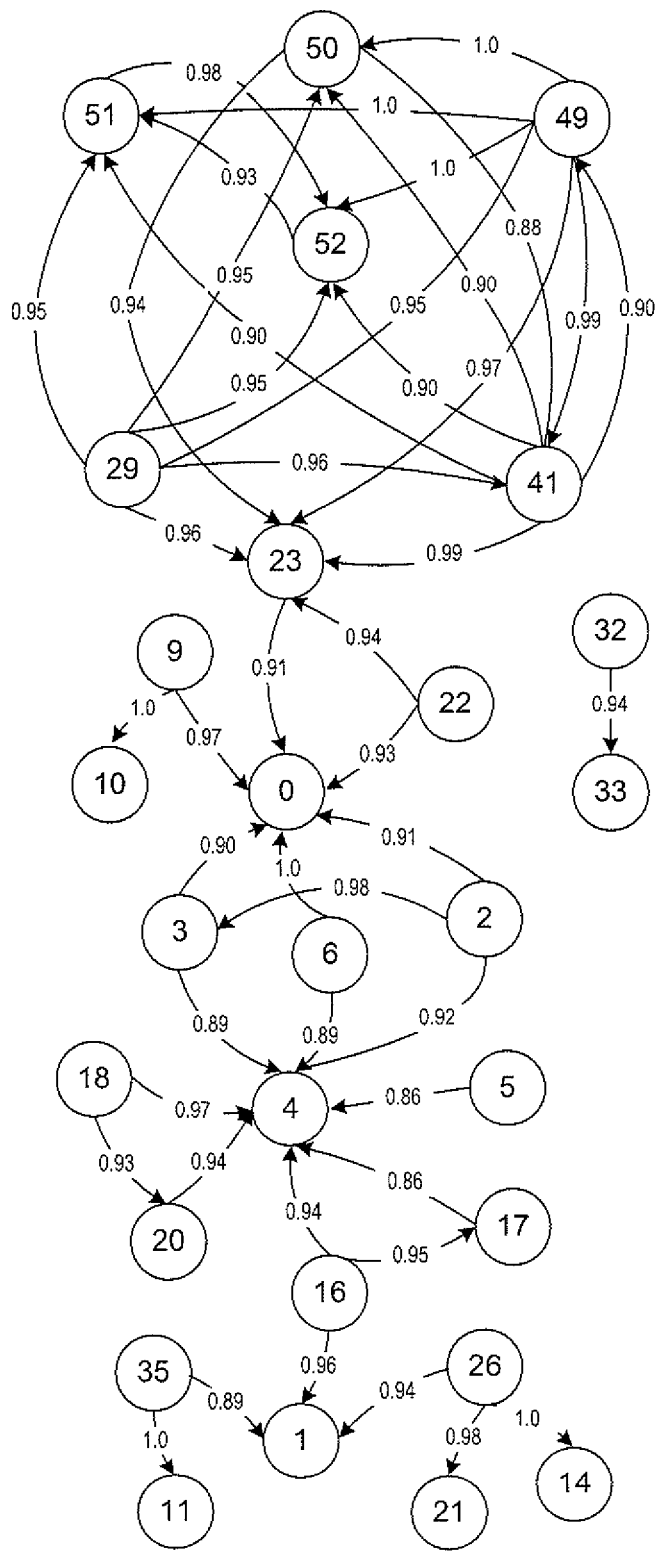
FIG. 13 shows a dynamical normalcy graph that represents a normalcy structure of a stream of log data.

FIG. 13 shows a DNG that represents a normalcy structure of the stream of log data processed on the above mentioned log data. FIG. 14 shows a table 1 that identifies the names of the nodes of the graph in FIG. 13. The DNG shown in FIG. 13 represents the pure event type correlations where the outlier relations are filtered out. Additionally, to compress the structure only strong correlations (higher 0.8) are illustrated. Similar graphs are obtained for a series of experiments that confirm that the virtual center has its inherent statistical and fundamental structure of event type behaviors independent of the applications that run on the VM's. Those experiments were performed for different portions of the virtual center stream of log data containing more than 1,000,000 event type records as well as for the whole data set. In all cases, it was possible to derive a DNG with high probabilistic connections between a subset of defined event types.

Several observations from the obtained DNG can be made:

I. DNG contains an unconnected fragment (nodes 32 and 33), i.e. a sub-graph, which means that the virtual center imprints isolatable event types. In case of the nodes 32 and 33, one may conclude that most of the time (94%) "VmBeingRelocatedEvent+info" results in "VmRelocatedEvent+info" with 6% failure that would result in an abnormal situation.

II. There are event types with only outgoing connections (like node 29) and event types with only incoming connections (node 4). In other words, the composite event type "VmRegisteredEvent+info" inevitably leads a collection of event types (23, 51, 49, etc.), meanwhile a series of event types (2, 5, 16, etc.) ultimately lead to "VmResourceReallocatedEvent+info."

III. An important class of correlations is related to deterministic connections. For example, "VmInstanceUuid-ConflictEvent+error" (49) generates "VmInstanceUuid-ChangedEvent+info" (51) without any alternative. The same happens with "VmRenamedEvent+warning" (35) and "VmReconfiguredEvent+info" (11), however these event types have no impact on other types and are of no influence to the rest of the system.

The extracted DNG shown in FIG. 13 is the "behavioral footprint" of the virtual center in terms of the behavior of the VMs. In other words, the lifecycle of any VM should follow the structure that the DNG dictates. Any deviation introduced by VMs in the current stream becomes the abnormalities. It can be either an evolving critical abnormality or an out-of-normal state that can also be inherent to the stream of log data in terms of its historical behavior. That is why typical out-of-normalcy (i.e., historical abnormality) of the stream is evaluated in order to differentiate it from the abnormality that becomes an alert.

Figure 15:
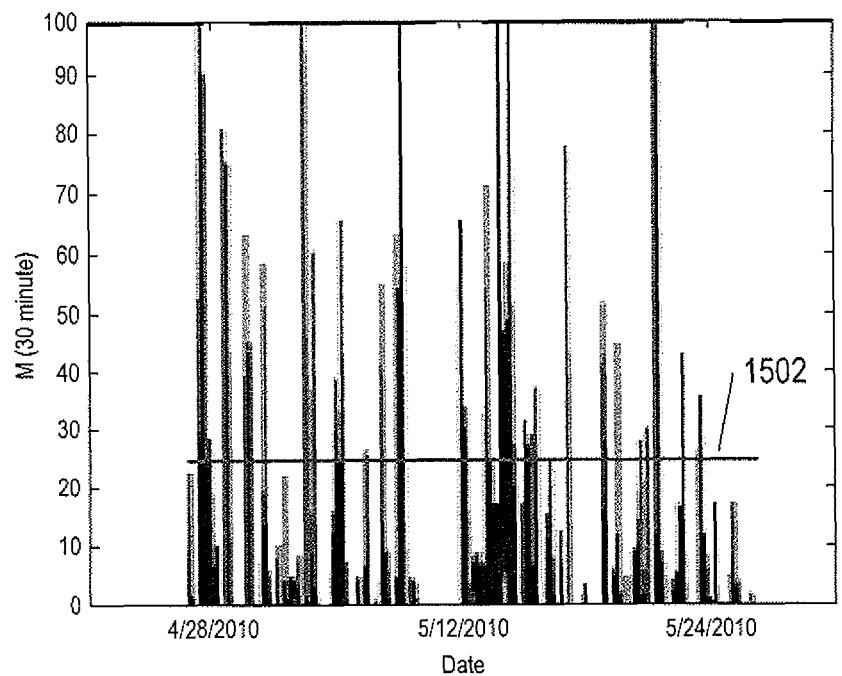
FIG. 15 shows mismatches along a historical data log for the extracted dynamic normalcy graph with an observation window of 30 minutes.
Figure 16:
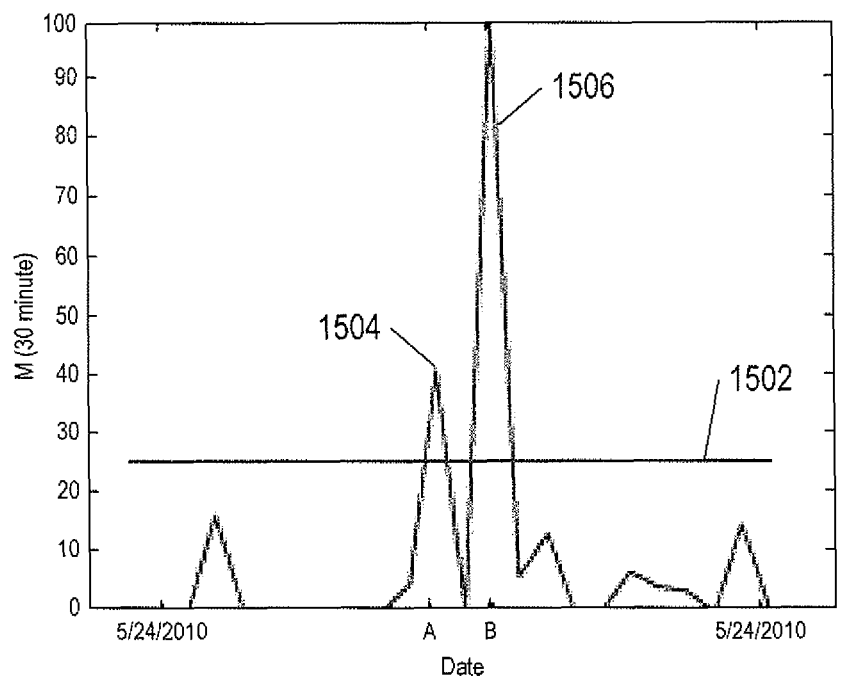
FIG. 16 shows abnormality peaks detected for event types represented in the dynamic normalcy graph of FIG. 13.

For the example of FIG. 13, the historical abnormality estimate $D_0(\Delta w)$ is computed and shown in the plot of FIG. 15. FIG. 15 shows the mismatches $M(\Delta w)$ along the historical log for the extracted DNG with an observation window $\Delta w=30$ minute sliding by 5 minute intervals. Here the computed value for $D_0(\Delta w)$ is 25.55% (for sensitivity s=0.7) as represented by line 1502. As a result, abnormalities are indicated at ran-time for values above this level. FIG. 16 shows abnormality jumps in run-time mode detected for the same log after its DNG extraction. For the two abnormality peaks 1504 and 1506 in FIG. 16, a list is generated indicating the highly probable misbehaving VMs in the table of FIG. 17. The first abnormality process occurred on May 24, 2010 at 04:17 PM (point A in FIG. 16) and the second one on May 24, 2010 at 05:18 PM (point B in FIG. 16). One VM was detected in each case that generated events, however, failed to generate the highly correlated events associated with them. The table in FIG. 17 shows these highly culpable VMs with mismatch scores of 40.9% and 100%, respectively, with columns of generated event ID and missing event ID. These results demonstrate that breakage of expected correlations become abnormality events that can indicate when it's appropriate to look into the log data. This can be a powerful tool in real-time analysis of streaming log data.

Figure 18:
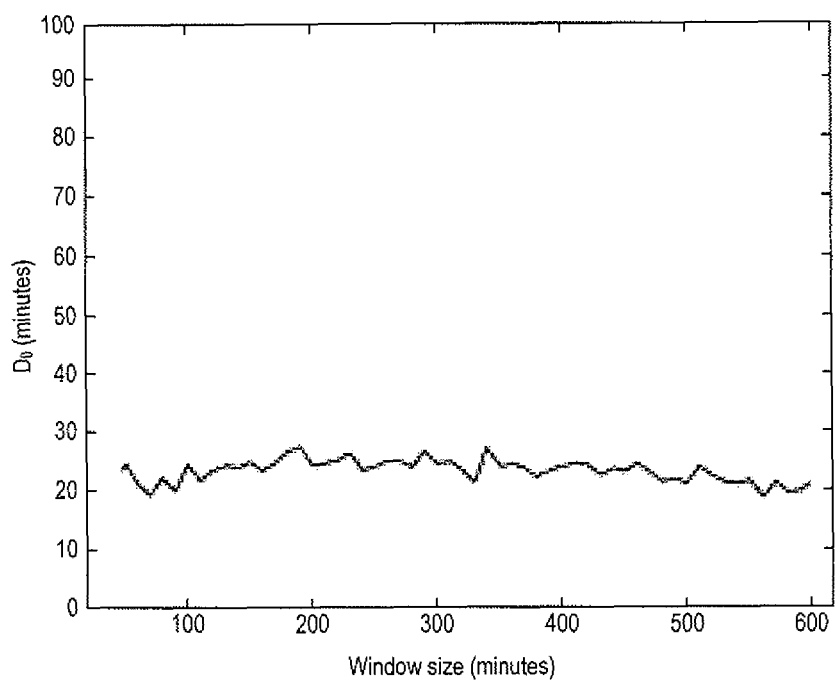
FIG. 18 shows a plot of estimated historical abnormality various observation window durations.

To show the robustness of the analysis according to the methods describes above against the online abnormality observation window size $\Delta w$, FIG. 18 shows a plot of the estimated historical abnormality $D_0(w)$ vs. $\Delta w$. Note the near constant behavior indicating a very small degree of methodic sensitivity to window size.

Embodiments described above are not intended to be limited to the descriptions above. For example, any number of different computational-processing-method implementations that carry out the methods for identifying anomalies in data may be designed and developed using various different programming languages and computer platforms and by varying different implementation parameters, including control structures, variables, data structures, modular organization, and other such parameters. Alternatively, thresholds, such as threshold $Th_{DNG}$, $Th_{similarity}$, and $Th_{mismatch}$, may be learned from the stream of log data by maintaining a record of similarity and mismatch measures and applying dynamic thresholding to the data.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A data-processing system comprising:
   one or more processors;
   one or more computer-readable media; and
   a routine that executes on the one or more processors to analyze a stream of digitally encoded log data output from a computational system and stored in the computer-readable media by
     maintaining a historical dynamic normalcy graph of meta-data that represents statistical patterns within the stream of log data based on a first set of event types from the stream of log data;
     detecting changes within the stream of log data based on similarities between the historical dynamic normalcy graph and a moving historical graph constructed from a second set of event types from the steam of log data; and
     identifying abnormalities in the stream of log data based on the statistical patterns and on detected changes within the stream of log data.

2. The system of claim 1, wherein maintaining the historical dynamic normalcy graph of meta-data further comprises:
   collecting the first set of event types from the stream of log data;
   calculating conditional probabilities for each pair of event types in the first set of event types;
   constructing a graph of meta-data with the event types in the first set of event types as nodes and the conditional probabilities as edges; and
   extracting the historical dynamic normalcy graph from the graph of meta-data.

3. The system of claim 2, wherein extracting the dynamic normalcy graph further comprises discarding conditional probabilities that are less than a dynamic normalcy threshold.

4. The system of claim 1, wherein detecting changes within the stream of log data further comprises:
   collecting the second set of event types from the stream of log data;
   calculating conditional probabilities for each pair of event types in the second set of event types;
   constructing the moving historical graph of meta-data with the event types in the second set of event types as nodes and the conditional probabilities as edges;
   calculating a similarity measure between the historical dynamic normalcy graph and the moving historical graph; and
   replacing the historical dynamic normalcy graph with the moving historical graph when the similarity measure is less than a similarity threshold.

5. The system of claim 1, wherein identify abnormalities in the stream of log data further comprises:
   collecting event types from the stream of log data within an observation time window;
   calculating a mismatch between the event types collected within the observation window and the event types represented in the historical dynamic normalcy graph;
   calculating a relative abnormality degree based on the mismatch and a historical abnormality;
   generating an alert when the relative abnormality degree is greater than zero; and
   identifying sources of event based on associated mismatches greater than a mismatch threshold.

6. The system of claim 5, wherein calculating a relative abnormality degree based on the mismatch and a historical abnormality further comprise:
   collecting a set of mismatches for pervious time increments of the observation window; and
   calculating the historical abnormality for the set of mismatches based on method of whiskers or dynamic thresholding.

7. A method carried out within a computer system having one or more processors and an electronic memory, the method comprising:
   collecting first and second sets of event types from a stream of log data, the second set of event types a subset of the first set of event types;
   maintaining a historical dynamic normalcy graph of meta-data that represents statistical patterns based on the first set of event types;
   detecting changes within the stream of log data based on the second set of event types; and
   identifying abnormalities in the stream of log data based on the statistical patterns and the detected changes and the event types collected within an observation window of the stream of log data.

8. The method of claim 7, wherein maintaining the historical dynamic normalcy graph of meta-data further comprises:
   calculating conditional probabilities for each pair of event types in the first set;
   constructing a graph of meta-data with the event types in the first set of event types as nodes and the conditional probabilities as edges; and
   extracting the historical dynamic normalcy graph from the graph of meta-data.

9. The method of claim 8, wherein extracting the dynamic normalcy graph further comprises discarding conditional probabilities that are less than a dynamic normalcy threshold.

10. The method of claim 7, wherein detecting changes within the stream of log data further comprises:
    calculating conditional probabilities for each pair of event types in the second set of event types;
    constructing a moving historical graph of meta-data with the event types in the second set of event types as nodes and the conditional probabilities as edges;
    calculating a similarity measure between the historical dynamic normalcy graph and the moving historical graph; and
    replacing the historical dynamic normalcy graph with the moving historical graph when the similarity measure is less than a similarity threshold.

11. The method of claim 7, wherein identify abnormalities in the stream of log data further comprises:
    calculating a mismatch between the event types in the first and second sets;
    calculating a relative abnormality degree based on the mismatch and a historical abnormality;

generating an alert when the relative abnormality degree is greater than zero; and identifying sources of event based on associated mismatches greater than a mismatch threshold.

12. The method of claim 11, wherein calculating a relative abnormality degree based on the mismatch and a historical abnormality further comprise:

collecting a set of mismatches for pervious time increments of the observation window; and calculating the historical abnormality for the set of mismatches based on method of whiskers or dynamic thresholding.

13. The method of claim 7, wherein the first set of event types is larger than the second set of event types.

14. A non-transitory computer-readable medium encoded with machine-readable instructions that implement a method carried out by one or more processors of a computer system to perform the operations of collecting first and second sets of event types from a stream of log data, the second set of event types a subset of the first set of event types;

maintaining a historical dynamic normalcy graph of meta-data that represents statistical patterns based on the first set of event types;

detecting changes within the stream of log data based on the second set of event types; and identifying abnormalities in the stream of log data based on the statistical patterns and the detected changes and the event types collected within an observation window of the stream of log data.

15. The medium of claim 14, wherein maintaining the historical graph of meta-data further comprises:

calculating conditional probabilities for each pair of event types in the first set of event types;

constructing a graph of meta-data with the event types in the first set of event types as nodes and the conditional probabilities as edges; and extracting the historical dynamic normalcy graph from the graph of meta-data.

16. The medium of claim 15, wherein extracting the dynamic normalcy graph further comprises discarding conditional probabilities that are less than a dynamic normalcy threshold.

17. The medium of claim 14, wherein detecting changes within the stream of log data further comprises:

calculating conditional probabilities for each pair of event types in the second set of event types;

constructing a moving historical graph of meta-data with the event types in the second set of event types as nodes and the conditional probabilities as edges;

calculating a similarity measure between the historical dynamic normalcy graph and the moving historical graph; and replacing the historical dynamic normalcy graph with the moving historical graph when the similarity measure is less than a similarity threshold.

18. The medium of claim 17, wherein identify abnormalities in the stream of log data further comprises:

calculating a mismatch between the event types in the first and second sets;

calculating a relative abnormality degree based on the mismatch and a historical abnormality;

generating an alert when the relative abnormality degree is greater than zero; and identifying sources of event based on associated mismatches greater than a mismatch threshold.

19. The medium of claim 18, wherein calculating the relative abnormality degree based on the mismatch and a historical abnormality further comprise:

collecting a set of mismatches for pervious time increments of the observation window; and calculating the historical abnormality for the set of mismatches based on method of whiskers or dynamic thresholding.

20. The medium of claim 19, wherein the first set of event types is larger than the second set of event types.

* * * * *